United States Patent [19]

Mimura et al.

[11] Patent Number: 5,744,110

[45] Date of Patent: Apr. 28, 1998

[54] METHOD FOR THE REMOVAL OF CARBON DIOXIDE FROM COMBUSTION EXHAUST GAS

[75] Inventors: Tomio Mimura; Shigeru Shimojo, both of Osaka; Masaki Iijima, Tokyo; Shigeaki Mitsuoka, Hiroshima, all of Japan

[73] Assignees: The Kansai Electric Power Co., Inc., Osaka; Mitsubishi Jukogyo Kabushiki Kaisha, Tokyo, both of Japan

[21] Appl. No.: 701,069

[22] Filed: Aug. 21, 1996

Related U.S. Application Data

[63] Continuation of Ser. No. 399,551, Mar. 7, 1995, abandoned.

[30] Foreign Application Priority Data

Mar. 9, 1994 [JP] Japan ................... 6-038267
Oct. 6, 1994 [JP] Japan ................... 6-242914

[51] Int. Cl.[6] ........................................... B01D 53/62
[52] U.S. Cl. .................................. 423/226; 423/228
[58] Field of Search .......................... 423/226, 227, 423/228, 229

[56] References Cited

U.S. PATENT DOCUMENTS

| | | | |
|---|---|---|---|
| 2,559,580 | 7/1951 | Alexander | 423/228 |
| 3,622,267 | 11/1971 | Bartholome | 23/2 R |
| 3,923,954 | 12/1975 | Petrey, Jr. | 423/210 |
| 4,094,957 | 6/1978 | Sartori et al. | 423/223 |
| 4,143,119 | 3/1979 | Asperger et al. | 423/226 |
| 4,336,233 | 6/1982 | Appl et al. | 423/228 |
| 4,440,731 | 4/1984 | Pearce | 423/228 |
| 4,477,419 | 10/1984 | Pearce et al. | 423/228 |

FOREIGN PATENT DOCUMENTS

| | | | |
|---|---|---|---|
| 558019 | 9/1993 | European Pat. Off. | 423/228 |
| 1 542 415 | 4/1970 | Germany. | |
| 1 904 428 | 8/1970 | Germany. | |
| 48-46585 | 7/1973 | Japan | 423/228 |
| 52-63171 | 8/1977 | Japan. | |
| 53-100180 | 12/1978 | Japan. | |
| 61-71819 | 7/1986 | Japan. | |
| 1543748 | 4/1979 | United Kingdom. | |

OTHER PUBLICATIONS

English Translation of Japan Patent Document No. 48 (1973)—46,585 (03 Jul. 1973).
Chemical Engineering Science, vol. 41, No. 4, pp. 405–408 and pp. 997–1003. (1986, No Month).
English Abstract for Japan Patent Document No. 46,585-A (03 Jul. 1973) Assigned to Mitsubishi Chemicals.

*Primary Examiner*—Gary P. Straub
*Assistant Examiner*—Timothy C. Vanoy
*Attorney, Agent, or Firm*—Jacobson, Price, Holman & Stern, PLLC

[57] ABSTRACT

This invention provides a method for the removal of $CO_2$ present in combustion exhaust gas which comprises bringing combustion exhaust gas at atmospheric pressure into contact with a mixed aqueous solution containing 100 parts by weight of an amino acid metal salt (X), 1 to 25 parts by weight of piperazine (Y), and optionally a copper compound in such an amount as to give a divalent copper ion concentration of 10 to 1,000 ppm based on the mixed aqueous solution, the amino acid metal salt being of the general formula $$CH_3NR^1CHR^2COOM \qquad (1)$$

wherein $R^1$ and $R^2$ represent hydrogen atoms or lower alkyl groups, provided that $R^2$ is a lower alkyl group when $R^1$ is a hydrogen atom, and $R^2$ is a hydrogen atom when $R^1$ is a lower alkyl group, and M represents an alkali metal.
Potassium dimethylaminoacetate is a preferred amino acid metal salt (X).

4 Claims, 1 Drawing Sheet

METHOD FOR THE REMOVAL OF CARBON DIOXIDE FROM COMBUSTION EXHAUST GAS

This is a continuation of application Ser. No. 08/399,551, filed Mar. 7, 1995 which was abandoned.

FIELD OF THE INVENTION AND RELATED ART STATEMENT

This invention relates to a method for the removal of $CO_2$ (carbon dioxide) present in combustion exhaust gas. More particularly, it relates to a method for the removal of $CO_2$ present in combustion exhaust gas at atmospheric pressure by using a mixed aqueous solution containing a specific amino acid metal salt, a specific amine compound and optionally a specific metallic compound.

In recent years, the greenhouse effect of $CO_2$ has been pointed out as a cause of the warming phenomena of the earth and countermeasures to it have come to be urgently required on an international scale for the purpose of protecting global environment. $CO_2$ sources cover all fields of human activities involving the combustion of fossil fuels, and there is a growing demand for the suppression of its emission. Correspondingly, for use in power-generating facilities (such as thermal electric power plants) using fossil fuels in large amounts, vigorous investigations are being conducted on the method of removing and recovering $CO_2$ present in combustion exhaust gas from a boiler by bringing the combustion exhaust gas into contact with an aqueous solution of an alkanolamine or the like, and the method of storing the recovered $CO_2$ without discharging it into the atmosphere.

Although useful alkanolamines include monoethanolamine, diethanolamine, triethanolamine, methyldiethanolamine, diisopropanolamine, diglycolamine and the like, it is usually preferable to use monoethanolamine (MEA).

However, the use of an aqueous solution of such an alkanolamine, typified by MEA, as an absorbent for absorbing and removing $CO_2$ from combustion exhaust gas is not always satisfactory in consideration of the amount of $CO_2$ absorbed for a given amount of an aqueous amine solution having a given concentration, the amount of $CO_2$ absorbed per mole of the amine in an aqueous amine solution having a given concentration, the rate of $CO_2$ absorption at a given concentration, and the thermal energy required for regeneration of the aqueous alkanolamine solution having absorbed $CO_2$.

Now, many techniques for separating acid gases from various mixed gases by use of an amine compound or the like are known.

In Japanese Patent Laid-Open No. 100180/'78, an amine mixture comprising at least 50 mole % of a hindered amine having at least one secondary amino group forming a part of the ring and attached to a secondary or tertiary carbon atom, or a primary amino group attached to a tertiary carbon atom, and at least 10 mole % of a tertiary amino-alcohol is described. In addition, a method for the removal of acid gases wherein a normally gaseous mixture is brought into contact with an amine-solvent liquid absorbent comprising the above-described amine mixture effective as a physical absorbent for acid gases and a solvent therefor is also described. It is stated therein that useful hindered amines include 2-piperidine-ethanol [i.e., 2-(2-hydroxyethyl) piperidine], 3-amino-3-methyl-1-butanol and the like, useful tertiary amino-alcohols include 3-dimethylamino-1-propanol and the like, and useful solvents include a sulfoxide compound which may contain up to 25% by weight of water. As an example of the gas to be treated, a normally gaseous mixture containing high concentrations of carbon dioxide and hydrogen sulfide (e.g., 35% $CO_2$ and 10-12% $H_2S$) is described therein. Moreover, $CO_2$ itself is used in some examples of this patent.

In Japanese Patent Laid-open No. 71819/'86, an acid gas scrubbing composition containing a hindered amine and a nonaqueous solvent such as sulfolane is described. As hindered primary monoamino-alcohols, 2-amino-2-methyl-1-propanol (AMP) and the like are enumerated and used. In the examples of this patent, $CO_2$-nitrogen and $CO_2$-helium mixtures are used as gases to be treated. Moreover, an aqueous solution of an amine and potassium carbonate is used as an absorbent. The use of water is also described therein. In this patent, the usefulness of hindered amines in absorbing carbon dioxide is explained with the aid of reaction formulas.

The carbon dioxide absorption behavior of an aqueous solution containing 2-amino-2-methyl-1-propanol (AMP) as a hindered amine is disclosed in Chemical Engineering Science, Vol.41, No.4, pp.997–1003. $CO_2$ and a $CO_2$-nitrogen mixture at atmospheric pressure are used as gases to be treated.

The rates of $CO_2$ and $H_2S$ absorption by an aqueous solution of a hindered amine (such as AMP) and an aqueous solution of a straight-chain amine (such as MEA) in the vicinity of ordinary temperature are reported in Chemical Engineering Science, Vol.41, No.2, pp.405–408. According to this report, when the partial pressure of $CO_2$ is 1 atm., there is little difference between those aqueous solutions at concentrations of 0.1–0.3M. However, when aqueous solutions having a concentration of 0.1M are used and the partial pressure of $CO_2$ is reduced from 1 atm. to 0.5 and 0.05 atm., the absorption rate of AMP is much lower than that of MEA at 0.05 atm.

U.S. Pat. No. 3,622,267 discloses a technique for purifying synthesis gas obtained by partial oxidation of crude oil or the like and having a high partial pressure of $CO_2$ (e.g., synthesis gas containing 30% $CO_2$ at 40 atm.) by use of an aqueous mixture containing methyldiethanolamine and monoethylmonoethanolamine.

Deutsche Offenlegungschrift Nr. 1,542,415 discloses a technique for enhancing the rate of $CO_2$, $H_2S$ and COS absorption by the addition of a monoalkylalkanolamine or the like to physical or chemical absorbents. Similarly, Deutsche Offenlegungschrift Nr. 1,904,428 discloses a technique for enhancing the absorption rate of methyldiethanolamine by the addition of monomethylethanolamine.

U.S. Pat. No. 4,336,233 discloses a technique for the purification of natural gas, synthesis gas and gasified coal by use of a washing fluid comprising an aqueous solution containing piperazine at a concentration of 0.81–1.3 moles per liter or an aqueous solution containing piperazine in combination with a solvent such as methyldiethanolamine, triethanolamine, diethanolamine or monomethylethanolamine.

Similarly, Japanese Patent Laid-Open No. 63171/'77 discloses a $CO_2$ absorbent comprising a tertiary alkanolamine, monoalkylalkanolamine or like compound to which piperazine or a piperazine derivative such as hydroxyethylpiperazine is added as a promoter.

Apart from them, there are already known techniques in which an aqueous solution of an amino acid metal salt of the general formula (1) used in the present invention is used to recover $CO_2$ from combustion exhaust gas or to recover $H_2S$ selectively, for example, from synthesis gas containing $CO_2$ and $H_2S$.

On the other hand, when a process for the absorption and removal of $CO_2$ from hot combustion exhaust gas containing oxygen and $CO_2$ by gas-liquid contact with an aqueous MEA solution is continuously carried out, all of the equipment made of metal, including the $CO_2$ absorption tower coming into contact with the combustion exhaust gas containing oxygen and $CO_2$ and with the absorbing solution, the regeneration tower for heating the absorbing solution to liberate $CO_2$ and thereby regenerate the absorbing solution, and the piping, heat exchangers and pumps installed therebetween, is corroded. Accordingly, if the equipment is constructed of materials employed in ordinary chemical plants, its useful life will be unduly short. Thus, although such a process may be practicable on a laboratory scale, it cannot possibly be employed for industrial purposes.

A method for mitigating the corrosion of equipment for absorbing $CO_2$ from such combustion exhaust gas containing oxygen and $CO_2$ by use of a $CO_2$ absorbing solution comprising an aqueous solution of MEA or its analogue is proposed in U.S. Pat. No. 4,440,731. According to this proposal, at least 50 ppm of divalent copper ion, together with dihydroxyethylglycine, an alkali metal carbonate, an alkali metal or ammonium permanganate, an alkali metal or ammonium thiocyanate, nickel or bismuth oxide, or the like, is added to the above-described absorbing solution. It is described therein that this method can suppress the decomposition of MEA or other compound used as absorbent, even in the treatment of combustion gas having a high oxygen concentration.

In the examples of this U.S. patent, only tests using an aqueous solution of MEA as an amine compound are described. More specifically, accelerated corrosion tests were conducted by supplying 30 pounds of $CO_2$ and 15 pounds of oxygen to a 30% aqueous MEA solution being refluxed and exposing mild steel coupons thereto at a temperature of 130° C. in the presence of various corrosion inhibitors. As a result, it is stated that the degree of corrosion was about 40-52 mils per year (mpy) when no corrosion inhibitor was added, but was reduced to 0.9-1.2 mpy when 200 ppm of copper carbonate [$CuCO_3.Cu(OH)_2.H_2O$, $CuCO_3$ content 56 wt. %] was added.

Apart from them, there are already known techniques in which an aqueous solution containing one amino acid metal salt of the general formula (1) used in the present invention as described later is used to recover $CO_2$ from combustion exhaust gas and an aqueous solution containing another amino acid metal salt is used to recover $H_2S$ selectively, for example, from synthesis gas containing $CO_2$ and $H_2S$.

SUMMARY OF THE INVENTION

As described above, an efficient method for the removal of $CO_2$ from combustion exhaust gas is needed. Specifically, it is a pressing important problem to choose a $CO_2$ absorbent which, when combustion exhaust gas is treated with an aqueous solution containing the absorbent at a given concentration, can provide a high $CO_2$ absorption per mole of the absorbent, a high $CO_2$ absorption per unit volume of the aqueous solution, and a high absorption rate. Moreover, it is desirable that the absorbent requires less thermal energy in separating the absorbed $CO_2$ to regenerate the absorbing solution. In particular, it is desired to improve the absorption rate of an absorbent having a low absorption rate in spite of its high $CO_2$ absorption capacity.

In addition, it is very important that the absorbing solution has low corrosiveness to carbon steel because the apparatus used to remove $CO_2$ from combustion exhaust gas is mostly made of a metal and, in particular, carbon steel which is cheaper than stainless steel.

In view of the above-described problems, the present inventors made intensive investigations on absorbents used to remove $CO_2$ present in combustion exhaust gas and have discovered that the use of a specific amino acid metal salt in combination with a relatively small amount of a specific amine compound is particularly effective in improving the $CO_2$ absorption rate of the amino acid metal salt. The present invention has been completed on the basis of this discovery.

Thus, according to a first aspect of the present invention, there is provided a method for the removal of $CO_2$ present in combustion exhaust gas which comprises bringing combustion exhaust gas at atmospheric pressure into contact with a mixed aqueous solution containing 100 parts by weight of an amino acid metal salt (X) and 1 to 25 parts by weight of piperazine (Y), the amino acid metal salt being of the general formula

$$CH_3NR^1CHR^2COOM \quad (1)$$

wherein $R^1$ and $R^2$ represent hydrogen atoms or lower alkyl groups, provided that $R^2$ is a lower alkyl group when $R^1$ is a hydrogen atom, and $R^2$ is a hydrogen atom when $R^1$ is a lower alkyl group, and M represents an alkali metal.

Moreover, the present inventors have also discovered that corrosiveness to carbon steel can be significantly reduced by adding a predetermined amount of a divalent copper compound to the above-described mixed aqueous solution. The present invention has also been completed on the basis of this discovery.

Thus, according to a second aspect of the present invention, there is provided a method for the removal of $CO_2$ present in combustion exhaust gas which comprises bringing combustion exhaust gas at atmospheric pressure into contact with a mixed aqueous solution containing 100 parts by weight of an amino acid metal salt (X), 1 to 25 parts by weight of piperazine (Y), and a copper compound in such an amount as to give a divalent copper ion concentration of 10 to 1,000 ppm based on the mixed aqueous solution, the amino acid metal salt being of the general formula

$$CH_3NR^1CHR^2COOM \quad (1)$$

wherein $R^1$ and $R^2$ represent hydrogen atoms or lower alkyl groups, provided that $R^2$ is a lower alkyl group when $R^1$ is a hydrogen atom, and $R^2$ is a hydrogen atom when $R^1$ is a lower alkyl group, and M represents an alkali metal.

When a mixed aqueous solution containing a specific amino acid metal salt (X) and piperazine (Y) is used as a $CO_2$ absorbing solution for combustion exhaust gas at atmospheric pressure according to the method of the first aspect of the present invention, an improvement in $CO_2$ absorption rate is achieved as compared with the case where the amino acid metal salt (X) is used alone. In addition, from the viewpoint of regeneration energy, $CO_2$ can be removed more efficiently than when MEA is used.

Moreover, when a mixed aqueous solution containing a specific amino acid metal salt (X), piperazine (Y) and a divalent copper solution is used as a $CO_2$ absorbing solution for combustion exhaust gas at atmospheric pressure according to the method of the second aspect of the present invention, corrosion properties, especially on carbon steel, are improved markedly.

DETAILED DESCRIPTION OF PREFERRED EMBODIMENTS

Figure 1:
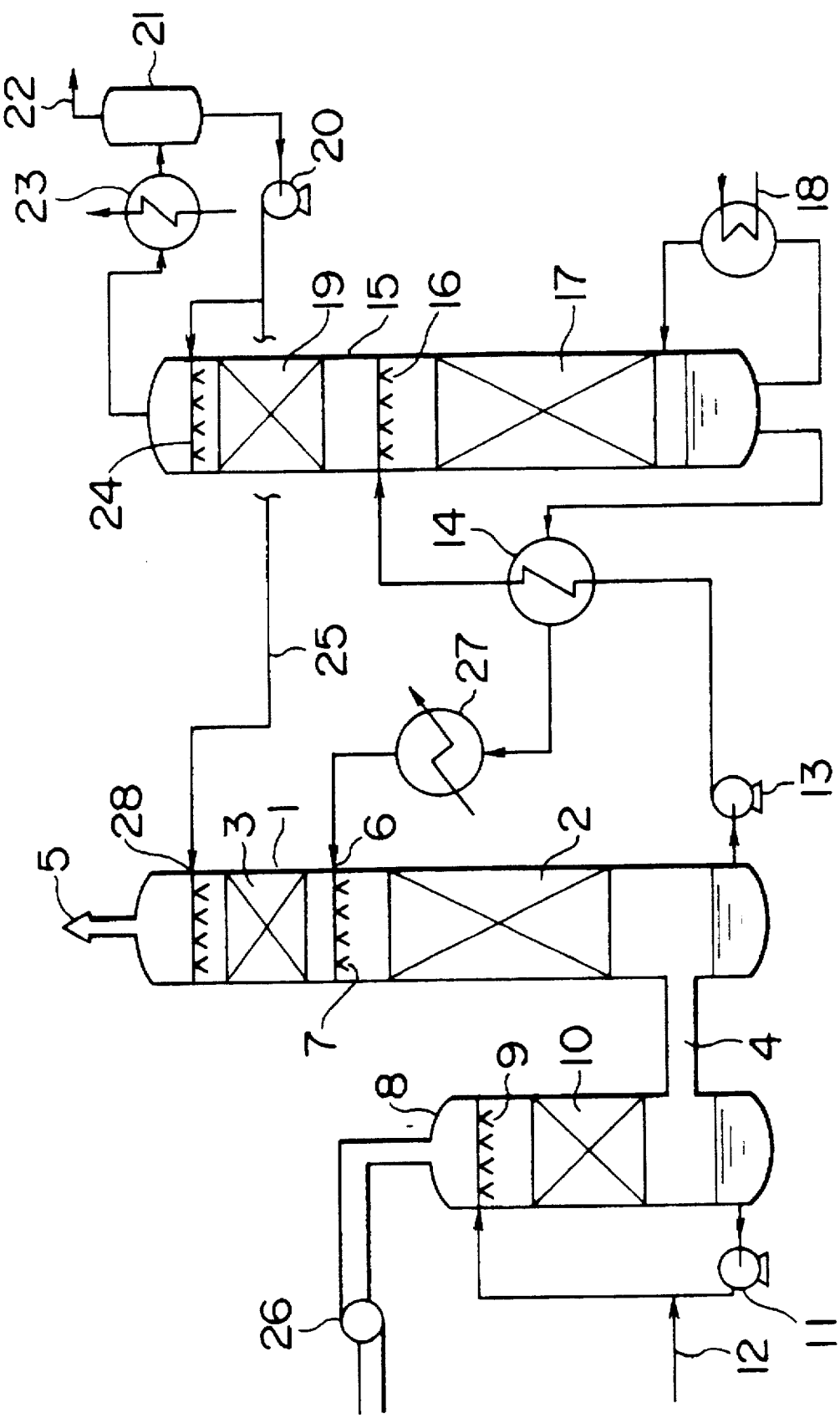
FIG. 1 is a schematic view illustrating an exemplary process which can be employed in the present invention.

In the amino acid metal salt (X) of the general formula (1) which is used in the present invention, examples of the lower alkyl groups represented by $R^1$ and $R^2$ include methyl, ethyl and propyl groups. Among others, methyl groups are especially preferred. Examples of the alkali metal represented by M include sodium and potassium. Among others, potassium is preferred. Examples of the amino acid metal salt (X) represented by the general formula (1) include potassium dimethylaminoacetate and potassium a-methylaminopropionate. Among others, potassium dimethylaminoacetate is preferred.

In the present invention, piperazine (Y) is used in combination with the amino acid metal salt (X).

The mixing ratio of the amino acid metal salt (X) and piperazine (Y) is such that piperazine (Y) is used in an amount of 1 to 25 parts by weight, preferably 1 to 10 parts by weight, per 100 parts by weight of the amino acid metal salt (X).

In the mixed aqueous solution containing the amino acid metal salt (X) and piperazine (Y) (hereinafter also referred to as "absorbing solution"), which is used as an absorbing solution for removing $CO_2$ present in combustion exhaust gas in the first aspect of the present invention, the concentration of the amino acid metal salt (X) is usually in the range of 15 to 65% by weight.

In the mixed aqueous solution containing the amino acid metal salt (X), piperazine (Y) and a divalent copper compound as described below (hereinafter also referred to as "absorbing solution"), which is used as an absorbing solution for removing $CO_2$ present in combustion exhaust gas in the second aspect of the present invention, the concentration of the amino acid metal salt (X) is usually in the range of 15 to 65% by weight.

A divalent copper compound is added to the mixed aqueous solution used in the second aspect of the present invention. Preferred examples of the copper compound include, but not limited to, copper carbonate [$CuCO_3.Cu(OH)_2.H_2O$] that is also called "basic copper carbonate". Copper carbonate is added in such an amount as to give a divalent copper ion concentration of 10 to 1,000 ppm, preferably 100 to 800 ppm and more preferably 200 to 600 ppm.

As used herein, the term "atmospheric pressure" covers variations of pressure in the vicinity of atmospheric pressure, as caused by the use of a blower for feeding combustion exhaust gas. At the time of contact with combustion exhaust gas, the temperature of the mixed aqueous solution is usually in the range of 30° to 70° C.

Although no particular limitation is placed on the process employed in the method for removing $CO_2$ present in combustion exhaust gas in accordance with the present invention, one example thereof is described with reference to FIG. 1. In FIG. 1, only major equipment is illustrated and incidental equipment is omitted.

The system illustrated in FIG. 1 has a decarbonation tower 1, a lower packed region 2, an upper packed region or trays 3, a combustion exhaust gas inlet port 4 to the decarbonation tower, a decarbonated combustion exhaust gas outlet port 5, an absorbing solution inlet port 6, a nozzle 7, an optionally installed combustion exhaust gas cooler 8, a nozzle 9, a packed region 10, a humidifying and cooling water circulating pump 11, a make-up water supply line 12, a $CO_2$-loaded absorbing solution withdrawing pump 13, a heat exchanger 14, an absorbing solution regeneration tower (hereinafter abbreviated as "regeneration tower") 15, a nozzle 16, a lower packed region 17, a regenerative heater (or reboiler) 18, an upper packed region 19, a reflux water pump 20, a $CO_2$ separator 21, a recovered $CO_2$ discharge line 22, a regeneration tower reflux condenser 23, a nozzle 24, a regeneration tower reflux water supply line 25, a combustion exhaust gas feed blower 26, a cooler 27 and a regeneration tower reflux water inlet port 28.

In FIG. 1, combustion exhaust gas is forced into combustion exhaust gas cooler 8 by means of combustion exhaust gas feed blower 26, humidified and cooled in packed region 10 by contact with humidifying and cooling water from nozzle 9, and then conducted to decarbonation tower 1 through combustion exhaust gas inlet port 4. The humidifying and cooling water which has come into contact with the combustion exhaust gas is collected in the lower part of combustion exhaust gas cooler 8 and recycled to nozzle 9 by means of pump 11. Since the humidifying and cooling water is gradually lost by humidifying and cooling the combustion exhaust gas, make-up water is supplied through make-up water supply line 12. If it is desired to cool the combustion exhaust gas to a greater extent than the foregoing humidified and cooled state, this can be accomplished by installing a heat exchanger between humidifying and cooling water circulating pump 11 and nozzle 9 to cool the humidifying and cooling water prior to its supply to combustion exhaust gas cooler 8.

In the lower packed region 2 of decarbonation tower 1, the combustion exhaust gas forced thereinto is brought into counterflow contact with an absorbing solution having a predetermined concentration and sprayed from nozzle 7. Thus, $CO_2$ present in the combustion exhaust gas is removed by absorption into the absorbing solution and the decarbonated combustion exhaust gas passes into upper packed region 3. The absorbing solution supplied to decarbonation tower 1 absorbs $CO_2$ and the resulting heat of reaction makes the absorbing solution hotter than its temperature at inlet port 6. This absorbing solution is withdrawn by $CO_2$-loaded absorbing solution withdrawing pump 13, heated by heat exchanger 14, and introduced into regeneration tower 15. The temperature of the regenerated absorbing solution can be regulated by heat exchanger 14 or cooler 27 which is optionally installed between heat exchanger 14 and absorbing solution inlet port 6.

In the lower packed region 17 of regeneration tower 15, the absorbing solution is regenerated through heating by regenerative heater 18. The regenerated absorbing solution is cooled by heat exchanger 14 and optionally installed cooler 27, and returned to decarbonation tower 1. In the upper part of regeneration tower 15, $CO_2$ separated from the absorbing solution is brought into contact with reflux water sprayed from nozzle 24, cooled by regeneration tower reflux condenser 23, and introduced into $CO_2$ separator 21 where $CO_2$ is separated from reflux water obtained by condensation of water vapor entrained thereby and then conducted to a $CO_2$ recovery process through recovered $CO_2$ discharge line 22. Part of the reflux water is recycled to regeneration tower 15 by means of reflux water pump 20, while the remainder is supplied to the regeneration tower reflux water inlet port 28 of decarbonation tower 1 through regeneration tower reflux water supply line 25. This regeneration tower reflux water contains a slight amount of absorbing solution and serves to remove a slight amount of $CO_2$ present in combustion exhaust gas by coming into contact with the combustion exhaust gas in the upper packed region 3 of decarbonation tower 1.

The present invention is further illustrated by the following examples.

EXAMPLES 1–4 AND COMPARATIVE EXAMPLES 1–4

A glass reactor placed in a thermostatic chamber was charged with 50 milliliters of a mixed aqueous solution containing an amino acid metal salt (X) (i.e., potassium dimethylaminoacetate or potassium a-methylaminopropionate) and piperazine at the respective concentrations shown in Table 1. While this solution was being stirred at a temperature of 40° C., a test gas was passed relatively small amount of piperazine (Y) according to the present invention, the initial $CO_2$ concentration in effluent gas is significantly reduced as compared with the case in which an amino acid metal salt (X) is used alone, indicating a marked improvement in absorption rate. This is particularly true when potassium dimethylaminoacetate is used in combination with a small amount of piperazine. This can also be seen from the fact that, when potassium dimethylaminoacetate is used in combination with a small amount of piperazine, the time required to attain 90% saturation is considerably reduced.

For purposes of comparison, the results obtained by using piperazine or MEA alone are also shown in Table 1.

TABLE 1

| | Absorbent (concentration in wt %) | | Saturated absorption of $CO_2$ | | 90% saturated absorption | | Initial $CO_2$ concentration in effluent gas (%) | Initial degree of absorption (%) |
|---|---|---|---|---|---|---|---|---|
| | Amino acid metal salt (X) | Piperazine (Y) or MEA | Molar ratio of $CO_2$ to amino acid metal salt (X) | Volume ratio of $CO_2$ ($Nm^3$) to absorbing solution ($m^3$) | Time (hours) | Volume ratio of $CO_2$ ($Nm^3$) to absorbing solution ($m^3$) | | |
| Comparative Example 1 | Potassium dimethylaminoacetate (30) | — | 0.83 | 39.7 | 1.5 | 23.8 | 7.0 | 32.3 |
| Example 1 | Potassium dimethylaminoacetate (30) | Piperazine (1.5) | 0.87 | 41.4 | 0.8 | 46.6 | 1.4 | 87.2 |
| Example 2 | Potassium dimethylaminoacetate (30) | Piperazine (3.0) | 0.92 | 44.0 | 0.6 | 65.9 | 0.6 | 94.6 |
| Comparative Example 2 | Potassium α-methylaminopropionate (30) | — | 0.69 | 32.7 | 0.5 | 58.9 | 1.0 | 90.9 |
| Example 3 | Potassium α-methylaminopropionate (30) | Piperazine (1.5) | 0.75 | 35.8 | 0.6 | 53.8 | 0.8 | 92.7 |
| Example 4 | Potassium α-methylaminopropionate (30) | Piperazine (3.0) | 0.75 | 35.9 | 0.7 | 46.1 | 0.3 | 97.3 |
| Comparative Example 3 | — | Piperazine (15) | 0.84 (‡) | 32.9 | — | — | — | — |
| Comparative Example 4 | — | MEA (30) | 0.56 (‡‡) | 61.6 | 0.7 | 92.7 | 0.0 | 99.9 |

(‡) Molar ratio of $CO_2$ to piperazine  (‡‡) Molar ratio of $CO_2$ to MEA therethrough under atmospheric pressure at a flow rate of 1 liter per minute. As the test gas, there was used a model combustion exhaust gas (equivalent to combustion exhaust gas from an LNG burner) which was composed of 10 mole % $CO_2$, 3 mole % $O_2$ and 87 mole % $N_2$ and had a temperature of 40° C.

After the test gas was passed until the $CO_2$ concentration of the effluent gas became equal to that of the influent gas, the amount of $CO_2$ contained in the absorbing solution was measured with a $CO_2$ analyzer (or total organic carbon analyzer). Thus, the saturated absorption of $CO_2$ as expressed by the volume ratio of $CO_2$ ($Nm^3$) to absorbing solution ($m^3$) and the molar ratio of $CO_2$ to amino acid metal salt were determined.

Moreover, the composition of the gas effluent from the glass reactor was continuously measured with a gas analyzer. Thus, the initial concentration of $CO_2$ present therein (i.e., the initial $CO_2$ concentration in effluent gas) and the degree of $CO_2$ absorption (i.e., the initial degree of absorption) were determined.

It can be seen from the results shown in Table 1 that, when an amino acid metal salt (X) is used in combination with a

EXAMPLE 5 AND COMPARATIVE EXAMPLE 5

In order to make a further study of the thermal energy required to regenerate the absorbing solution, the heat of reaction between the absorbing solution and $CO_2$ (i.e., the quantity of heat released as a result of $CO_2$ absorption) was measured with respect to the absorbing solutions (having a concentration of 30 wt. %) used in Example 1 and Comparative Example 4. Specifically, 200 g of the absorbing solution to be tested was placed in an adiabatic tester and stirred with a magnetic stirrer until the temperature of the absorbing solution was stabilized. Then, pure $CO_2$ was blown through the tester at a flow rate of about 200 cc/min., and the flow rates of $CO_2$ at the inlet and outlet of the tester and the temperature of the absorbing solution were recorded continuously. The test was finished when the flow rate of $CO_2$ at the outlet of the tester increased sharply.

For various intervals of the molar amount of $CO_2$ absorbed, the heat of reaction (kcal/mol) evolved per mole of $CO_2$ absorbed into the absorbing solution was calculated from the number of moles of $CO_2$ absorbed into the absorbing solution (molar load) and the rise in temperature from the start of $CO_2$ blowing. The heat capacity of the tester was determined by placing 200 g of water in the tester, operating the heater at 30.0 V and 0.3 A for a predetermined time, and measuring the rise in temperature. The testing temperature ranged from 20° C. to 80° C. and the room temperature at the time of measurement ranged from 20° C. to 25° C. The results thus obtained are shown in Table 2.

TABLE 2

| Molar ratio of $CO_2$ to absorbent | Comparative Example 5: MEA (kcal/mol) | Example 5: potassium dimethylaminoacetate + piperazine (*)(kcal/mol) |
|---|---|---|
| 0–0.10 | 19.2 | 16.1 |
| 0.10–0.20 | 20.2 | 11.3 |
| 0.20–0.30 | 19.6 | 11.8 |
| 0.30–0.40 | 19.8 | 12.1 |
| 0.40–0.50 | 18.5 | 10.7 |
| 0.50–0.60 |  | 12.4 |
| 0.60–0.70 |  | 11.0 |
| 0.70–0.80 |  | 10.6 |
| 0.80–0.90 |  | 9.7 |
| 0.90–1.00 |  | 11.0 |
| 1.00–1.10 |  | 9.9 |

(*) Piperazine was added in an amount of 3 wt. %.

As can be seen from Table 2, the heat of reaction between the mixed absorbent used in the present invention and $CO_2$ is less than when MEA is used alone. Thus, this mixed absorbent has been found to be advantageous because the amount of energy required for its regeneration is significantly smaller as compared with MEA.

EXAMPLES 6–7 AND COMPARATIVE EXAMPLES 6–7

A test piece (with a surface area of about 1.9 square inches and a weight of about 8.2 g) of carbon steel (SS41) was abraded with abrasive papers No. 120, No. 240 and No. 400 (JIS R6252) in that order, washed with acetone, dried in a vacuum, and weighed.

Thereafter, this test piece was transferred to a glass test vessel containing 700 ml of an absorbing solution previously saturated with $CO_2$. In the atmosphere, this test vessel was placed in a 2-liter pressure vessel made of stainless steel, which was then sealed tightly.

After this stainless steel pressure vessel was placed in a high-temperature dryer and allowed to stand at 130° C. for 48 hours, the test piece was taken out, washed, dried in a vacuum, and weighed. This test was carried out in duplicate for each absorbing solution. The results thus obtained are shown in Table 3. In this table, the term "copper ion" means that copper carbonate was added to the absorbing solution in such an amount as to give the indicated divalent copper ion concentration.

TABLE 3

| Mixed aqueous solution | Degree of Corrosion (mm/year)* |
|---|---|
| Example 6 | Potassium dimethylaminoacetate: 30 wt. % Piperazine: 3 wt. % Copper ion: 500 ppm | 0.5 (21.4) |

TABLE 3-continued

| Mixed aqueous solution | Degree of Corrosion (mm/year)* |
|---|---|
| Comparative Example 6 | Potassium dimethylaminoacetate: 30 wt. % Piperazine: 3 wt. % | 5.4 (220) |
| Example 7 | Potassium α-methylaminopropionate: 30 wt. % Piperazine: 3 wt. % Copper ion: 500 ppm | 1.1 (44) |
| Comparative Example 7 | Potassium α-methylaminopropionate: 30 wt. % Piperazine: 3 wt. % | 9.1 (359) |

*The values expressed in mpy are given in parentheses.

We claim:

1. A method for the removal of $CO_2$ present in combustion exhaust gas containing oxygen gas which comprises bringing combustion exhaust gas at atmospheric pressure into contact with a mixed aqueous solution containing, as an absorbent, 100 parts by weight of potassium dimethylaminoacetate (X) per 1 to 25 parts by weight of piperazine (Y), the concentration of the potassium dimethylaminoacetate (X) in the mixed aqueous solution being in the range of 15 to 65% by weight, and said solution having a saturated absorption value of $CO_2$ above 41 $Nm^3/m^3$, an initial degree of $CO_2$ absorption above 87% and an average amount of heat required for regeneration of the absorbent below 12 kcal/mol, send average being taken over measurements at every 0.10 interval in the range from 0 to 1.10 of the molar ratio of $CO_2$ to absorbent at testing temperatures ranging from 20° C. to 80° C.

2. A method for the removal of $CO_2$ present in combustion exhaust gas containing oxygen gas which comprises bringing combustion exhaust gas at atmospheric pressure into contact with a mixed aqueous solution containing, as an absorbent, 100 parts by weight of potassium dimethylaminoacetate (X) per 1 to 25 parts by weight of piperazine (Y), the concentration of the potassium dimethylaminoacetate (X) in the mixed aqueous solution being in the range of 15 to 65% by weight and a copper compound in such an amount as to give a divalent copper ion concentration of 10 to 1,000 ppm based on the mixed aqueous solution and said solution having a saturated absorption value of $CO_2$ above 41 $Nm^3/m^3$, an initial degree of $CO_2$ absorption above 87%, an average amount of heat required for regeneration of the absorbent below 12 kcal/mol, said average being taken over measurements at every 0.10 interval in the range from 0 to 1.10 of the molar ratio of $CO_2$ to absorbent at testing temperatures ranging from 20° C. to 80° C., and reducing the corrosion on the carbon steel below 22 mm/year.

3. A method according to claim 1 wherein the concentration of the potassium dimethylaminoacetate (X) in the mixed aqueous solution is about 30% by weight.

4. A method according to claim 1 wherein the mixed aqueous solution contains 100 parts by weight of potassium dimethylaminoacetate (X) per 5 to 10 parts by weight of piperazine (Y).

* * * * *